Feb. 9, 1937.  T. C. STEWARD  2,070,188

LATHE TOOL HOLDER

Filed June 17, 1935

INVENTOR
T. C. Steward
BY
Johnston & Jennings
ATTORNEY

Patented Feb. 9, 1937

2,070,188

UNITED STATES PATENT OFFICE 2,070,188

LATHE TOOL HOLDER

Truman C. Steward, Birmingham, Ala.

Application June 17, 1935, Serial No. 26,987

1 Claim. (Cl. 82—36)

My invention relates to lathe tool holders and has for its principal objects the provision of a device of the character described, which shall be extremely rigid and steady in operation; which may be quickly adjusted to the proper position for the work in hand; which shall afford to the lathe operator the maximum of accessibility for observation and adjustment in the various lathe operations; which shall be particularly adapted for holding all the tools ordinarily employed in lathe operations; and with which a change from one type of tool to another may be made with the maximum of ease and rapidity.

Briefly, my improved tool holder comprises a relatively heavy arm member having a lower flat side adapted to rest upon the upper flat surface of, and be secured to, the usual compound slide of a lathe. The arm member is secured to the compound slide by means of the usual clamping screw whereby it may be swung arcuately to any desired position and also moved horizontally along the slot. In all working positions the major portion of the lower flat side of the arm member rests on the upper flat side of the compound slide whereby the maximum of steadiness of operation and rigidity is obtained. Near the outer end of the arm member is mounted a tool bit holder which may be turned relative to the arm member for adjusting the tool being used to any desired position. With the assembly just described it will be seen that for the purpose of adjustability to the work, I provide a double pivotal support for the tool holder by means of which it may be swung horizontally to an infinite number of positions and adjusted so as to engage the work with a minimum of overhang of the tool carriage.

A device embodying features of my invention is illustrated in the accompanying drawing, forming a part of this application, in which Fig. 1 is a plan view of my improved tool holder adjusted to left hand position in turning;

Figure 1:
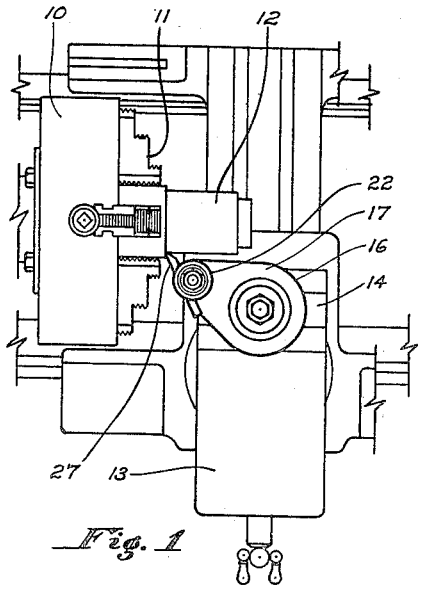

Referring to the drawing for better understanding of my invention, I show in Figs. 1 to 3 and 5 a fragmentary portion of a lathe including a face plate 10 with a chuck 11 and a piece to be worked on 12. The usual compound slide is shown at 13 with its T-slot 14 extending transversely of the slide. As is usual, the upper surfaces on each side of the T-slot are flat.

On the slide 13 is mounted my improved tool holder 16. The tool holder comprises an arm member 17 having an under flat surface resting upon the upper flat surface of the compound slide 13. The tool holder 16 is held in place on the compound slide by means of a clamping bolt 18, having a head 19 fitting in the T-slot 14, and adapted to be tightened in place by means of a nut 21. By this means, the arm member 17 may be swung to any desired position horizontally on the slide 13. Near the outer end of the arm member 17 is mounted a bit holder 22 having appropriate slots 23 in which the required tool for the work in hand is inserted and which is securely clamped in place by means of the nut 24 on the bolt 26.

Figure 2:
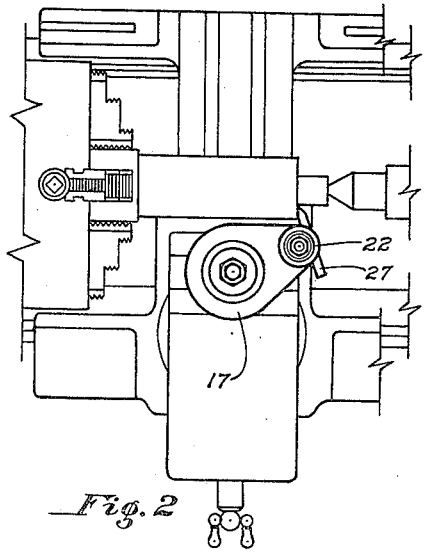
Fig. 2 is a view similar to Fig. 1, showing the device adjusted to right hand position.
Figure 3:
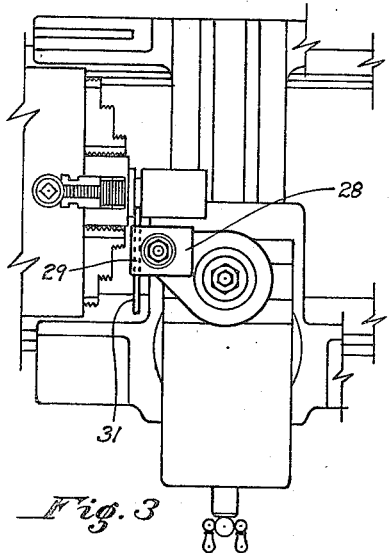
Fig. 3 is a plan view of the device, showing it used with a cut off tool.

In using my improved tool holder, the arm member 17 is so positioned with respect to the T-slot 14 that the major portion thereof rests upon the upper flat surface of the slide 13. In Fig. 1, I show the arm member 17 in its left hand position with a turning bit 27 in place in the bit holder 22. In this position it will be seen that the arm member is toward the right of the center of the T-slot 14 and that the bit 27 has a minimum of overhang of the slide 13. In Fig. 2 I show the tool holder in what I term right hand position, that is, with the arm member 17 positioned toward the left of the center of the T-slot 14 and with the bit 27 barely overhanging the right hand edge of the slide 13. It may be seen that with either position, I provide the maximum of rigidity of the bit 27, the maximum of adjustability to the work, and a minimum of overhang for the bit, with respect to the slide 13.

In order to adapt my improved device for use with different tools, I provide suitable holders for special tools. For example, in Fig. 3 I show a bit holder 28 having appropriate transverse slots 29 therein which are adapted to hold a cut off tool 31. With this bit holder a cut off tool from ordinary flat stock may be made and fitted into the slot 29 and, the tool holder being adjustable to a close position with respect to the work, it will be found entirely satisfactory.

Figure 5:
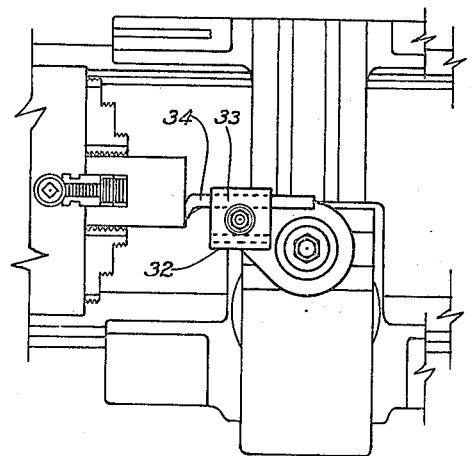
Fig. 5 is a view similar to Figs. 1 to 3, showing the boring or knurling tool used with the device.
Figure 4:
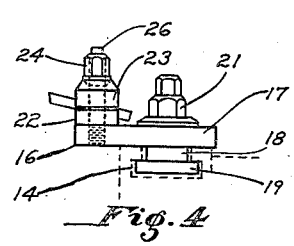
Fig. 4 is a side elevational view showing the tool holder removed from the lathe.

In Fig. 5 I show a bit holder 32 provided with suitable slots 33 for holding a knurling or boring tool 34. It will be seen that with all of the described operations, my improved tool holder provides a means whereby it is adjustable to an extremely close position with respect to the work, and is always so positioned that the strain on the tool bit is distributed over a large area of the slide 13. In these respects, my improved tool holder distinguishes over prior art devices with which I am familiar. In such prior art devices, the major portion of the strain, due to the work, had to be taken by an element corresponding to the clamping bolt 18. The strain was thus concentrated on a small area which, especially in the case of heavy work, almost inevitably led to chattering of the tool.

My improved tool holder thus provides a means whereby larger and heavier cuts may be made and the work more rapidly accomplished, while the steadiness and rigidity of the structure provides for greater accuracy.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claim.

What I claim is:

An adjustable tool holder comprising, in combination with the compound slide of a lathe having a pair of spaced parallel guideways, of a rotatable arm mounted on said guideways, said arm being substantially circular with an outwardly extending projection, the diameter of said circular portion being of such dimension as to have a surface engagement with said guideways throughout its rotative movement, a pivot and clamping bolt received within said guideways and passing centrally through the circular portion of said rotatable arm thereby to support said rotatable arm approximately to its projection in all its operating positions on the compound slide, and a tool clamp mounted for rotative adjustment in a horizontal plane above and on the projecting end of said rotatable arm.

TRUMAN C. STEWARD.